(12) United States Patent
Pan et al.

(10) Patent No.: US 8,643,294 B2
(45) Date of Patent: Feb. 4, 2014

(54) SINGLE STAGE ELECTRONIC BALLAST WITH POWER FACTOR CORRECTION

(75) Inventors: Ching-Tsai Pan, Hsinchu (TW); Po-Yen Chen, Taipei (TW); En-Lin Chen, Taipei (TW); Chih-Lung Lee, Kaohsiung (TW); Yu-Chuan Wang, Tainan (TW)

(73) Assignee: National Tsing Hua University, Hsinchu (TW)

( * ) Notice: Subject to any disclaimer, the term of this patent is extended or adjusted under 35 U.S.C. 154(b) by 145 days.

(21) Appl. No.: 13/414,765

(22) Filed: Mar. 8, 2012

(65) Prior Publication Data

US 2013/0181625 A1    Jul. 18, 2013

(30) Foreign Application Priority Data

Jan. 13, 2012 (TW) .............................. 101101458 A (51) Int. Cl.
  *H05B 37/00* (2006.01)
(52) U.S. Cl.
  USPC ..................... 315/200 R; 315/224; 315/291

(58) Field of Classification Search
  USPC ........... 315/200 R, 209 R, 224, 247, 291, 307
  See application file for complete search history.

(56) References Cited

U.S. PATENT DOCUMENTS

| | | | | |
|---|---|---|---|---|
| 5,534,755 A | * | 7/1996 | Deavenport et al. | 315/307 |
| 6,856,102 B1 | * | 2/2005 | Lin et al. | 315/291 |
| 8,253,351 B2 | * | 8/2012 | Yamamoto et al. | 315/307 |
| 8,410,721 B2 | * | 4/2013 | Busse et al. | 315/307 |

* cited by examiner

*Primary Examiner* — James H Cho
(74) *Attorney, Agent, or Firm* — Birch, Stewart, Kolasch & Birch, LLP (57) ABSTRACT

A single stage electronic ballast with power factor correction is provided. The single stage electronic ballast can work under the present intensity discharge lamp without any change and provide higher efficient, lower power consumption of lighting system, and better lighting quality of lamps. The single stage electronic ballast can also provide a stable current to load (lamp) for a long time. The single stage electronic ballast includes a first switch and a second switch that are controlled with complementary switching so as to provide an output voltage in response to the input power source and the variation of the load.

7 Claims, 10 Drawing Sheets

SINGLE STAGE ELECTRONIC BALLAST WITH POWER FACTOR CORRECTION

TECHNICAL FIELD

The present invention relates to a electronic ballast, more especially a single stage electronic ballast with an ability of power factor correction.

BACKGROUND

Due to the eco-conscious awareness and the impact of the energy crisis, most people are aware of the importance of the energy. At the same time, the power consumption standards of the household appliances are increased in each country. As a result, people are trend to develop low power consumption, high efficiency appliances. The power consumption of the lighting devices are dramatically huge due to the lighting devices are equipped everywhere. The fluorescent lamps and the high-intensity discharge (HID) lamps have an electronic characterize of negative incremental resistance due to their gas-discharge characterize. Thus, ballasts are necessary to stable the current flowing through the lamp.

Figure 1:
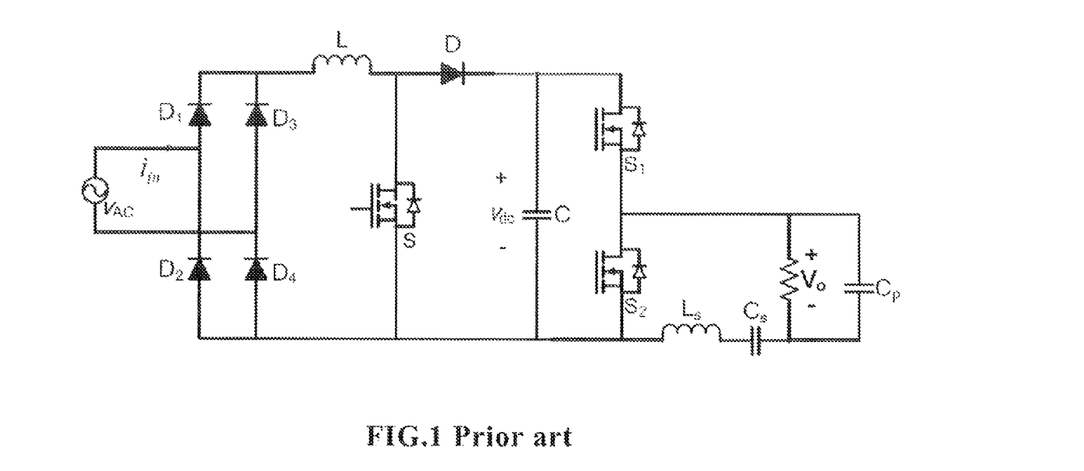
FIG. 1 illustrates a conventional schematic of duo stage electronic ballast.

FIG. 1 illustrates a conventional schematic of duo stage electronic ballast. The full bridge rectifier formed by the diodes $D_1 \sim D_4$ rectifies an AC power source $V_{AC}$ into a DC power. And the front stage active power factor correction circuit which includes an inductor L, a capacitor C, an active switch S and a diode corrects the power factor on the AC power source side. Then, the resonant inverter with series resonant parallel loaded (SRPL) which includes an active switch $S_1$, $S_2$, an inductor $L_S$, and capacitors $C_S$ and $C_P$ provides the required power of a load (lamp) and generates an output voltage $V_O$. However, the conventional topology of the electronic ballast includes two control circuits and the conventional electronic ballast has one more power consumption. thus, the efficiency of the power conversion of the conventional electronic ballast is low, the cost of the ballast is high, and the size of the ballast is huge. Moreover, the capacitors of the conventional electronic ballast are electrolytic capacitors so as can just meet the capacitance requirement.

Figure 2:
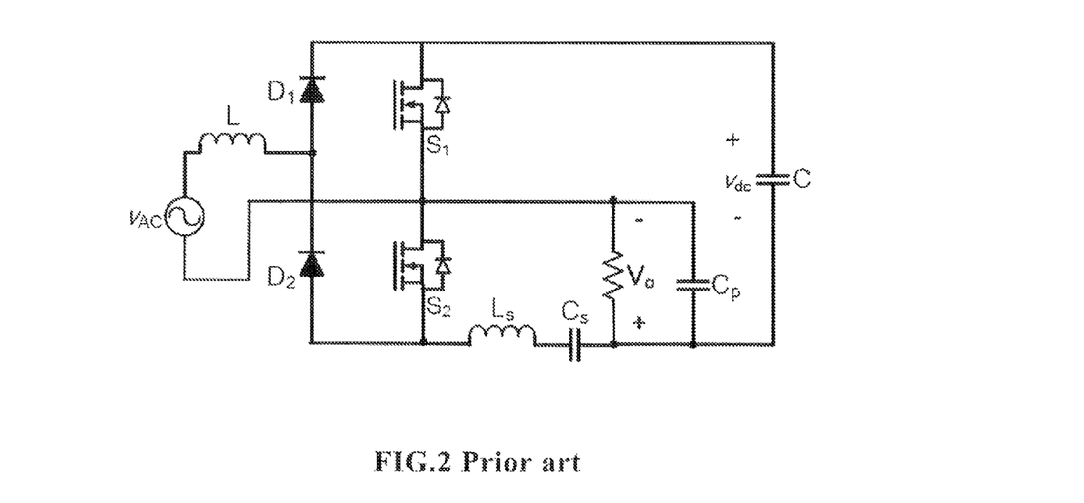
FIG. 2 illustrates a conventional schematic of single stage electronic ballast with high power factor.

FIG. 2 illustrates a conventional schematic of single stage electronic ballast with high power factor. A controllable half bridge rectifier includes an inductor L, diodes $D_1$ and $D_2$, active switches $S_1$ and $S_2$, and a DC-link capacitor C, an AC source $V_{AC}$ is rectified by the half bridge rectifier and the active switches $S_1$ and $S_2$ are controlled to switch so as to achieve the goal of high power factor control. A DC voltage $V_{DC}$ is generated cross the capacitor C. The DC voltage $V_{DC}$ is a DC voltage resource and the switches $S_1$ and $S_2$ series coupled with a resonant inductor $L_S$ and a capacitor $C_S$, and the active switch $S_2$, the resonant inductor $L_S$, and the capacitor $C_S$ parallel coupled to a capacitor $C_P$ to from the resonant inverter with series resonant parallel loaded c(SRPL). An output voltage Vo is generated over the load. This kind of single stage electronic ballast integrates the front stage and the back stage and share two active switch $S_1$ and $S_2$ so as can omit one control circuit and the number of the component can be reduced. In other words, aforementioned electronic ballast has the advantage of low cost. However, this electronic ballast still needs electrolytic capacitors to increase the capacitance.

Comparing to the conventional the conventional inductance ballast, the electronic ballast has the advantages of low noise, no twinkle, and high power factor. However, the capacitors of the electronic ballast have to be implemented as electrolytic capacitors and it will cause the short life time issue. Thus, most of the ballasts are inductance ballasts currently.

The present invention disclosed a high efficiency electronic ballast which can work under the present intensity discharge lamp without any change. It can provide higher efficient, lower power consumption of lighting system, and better lighting quality of lamps. Moreover, the present invention can provide a stable current to load (lamp) for a long time.

SUMMARY

One of the purposes of the invention is to disclose a single stage electronic ballast with power factor correction.

In one embodiment, a single stage electronic ballast with power factor correction includes a first inductor, coupled between a first node and a second node; a first capacitor, coupled between said second node and a third node; a second inductor, coupled between said third node and a fourth node, wherein said fourth node couples to a negative end of a load; a second capacitor and a third inductor coupled in series between a positive end of said load and a fifth node; a fourth inductor coupled between said fifth node and a sixth node; a first switch coupled between said second node and said sixth node; a diode coupled between said third node and said sixth node; a third capacitor coupled between said fourth node and said sixth node; and a second switch and a fifth inductor coupled in series between said fourth node and said fifth node; wherein, said first node and said sixth node coupled to a positive end and a negative end of an input power source respectively, and wherein said first switch and said second switch are controlled with complementary switching so as to provide an output voltage in response to said input power source and a variation of said load.

The electronic ballast in accordance of the present invention complementary switches the first switch and the second switch, thus, the control circuit of the electronic ballast is simple. Moreover, the capacitance of the DC-link capacitors in the electronic ballast can be reduced and avoid the usage of the electrolytic capacitors so as can extend the life time of the ballast.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The word "couple" we used in this specification means directly/indirectly connection. In other words, a first apparatus couples to a second apparatus indicates that the first apparatus can directly connect to the second apparatus by electrically connection, wireless connection, or optical connection, but not limited to. Or, the first apparatus can electrically or signally connect to the second apparatus via any other device or connection means indirectly.

The description of the "and/or" in this specification includes one of the listed objects or any combination of the multiple objects. In addition, unless specifically stated by this specification, otherwise, the usage of any singular terms in this specification includes the meaning of plural also.

Figure 3:
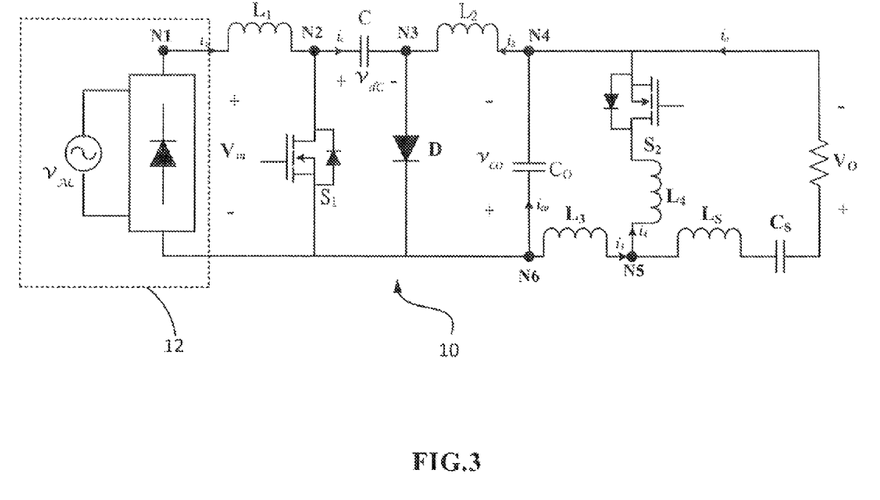
FIG. 3 illustrates a schematic of single stage electronic ballast with power factor correction in accordance with one embodiment of the present invention.

FIG. 3 illustrates a schematic of single stage electronic ballast with power factor correction in accordance with one embodiment of the present invention. In the single stage electronic ballast 10, an AC source $V_{AC}$ is rectified by a rectifier circuitry 12 and generates an input voltage $V_{in}$ wherein the voltage wave form of the input voltage $V_{in}$ is the absolute value of the sine wave of the AC source. Wherein, the capacitance of the DC-link capacitor C is small enough so that the DC-link voltage $V_{dc}$ has a voltage wave of the absolute value of the sine wave of the AC source, and the capacitance of the DC-link capacitor C is adequate to keep the output voltage Vo within an acceptable range and approximate to a constant value when the resonant inverter is in operation.

In one embodiment, an inductor $L_1$ is coupled between a node N1 and a node N2, the DC-link capacitor C is coupled between the node N2 and a node N3, an inductor $L_2$ is coupled between the node N3 and a node N4, the node N4 is coupled to a negative end of a load, a capacitor $C_s$ and an inductor Ls are series coupled between a positive end of the load and a node N5, an inductor L3 is coupled between the node N5 and a node N6, and a switch $S_1$ is coupled between the node N2 and the node N6, a diode D is coupled between a node N3 and the node N6, a capacitor $C_o$ is coupled between the node N4 and the node N6, a switch $S_2$ and an inductor $L_4$ are series coupled between the node N4 and the node N5. Wherein, the node N1 and the node N6 are coupled to two ends of the rectifier circuitry 12, respectively, in order to receive the input voltage $V_{in}$. Switches $S_1$ and $S_2$ are complementary switching with each other so as to regulate the resonant current $i_o$ and to generate the output voltage $V_o$.

Figure 4:
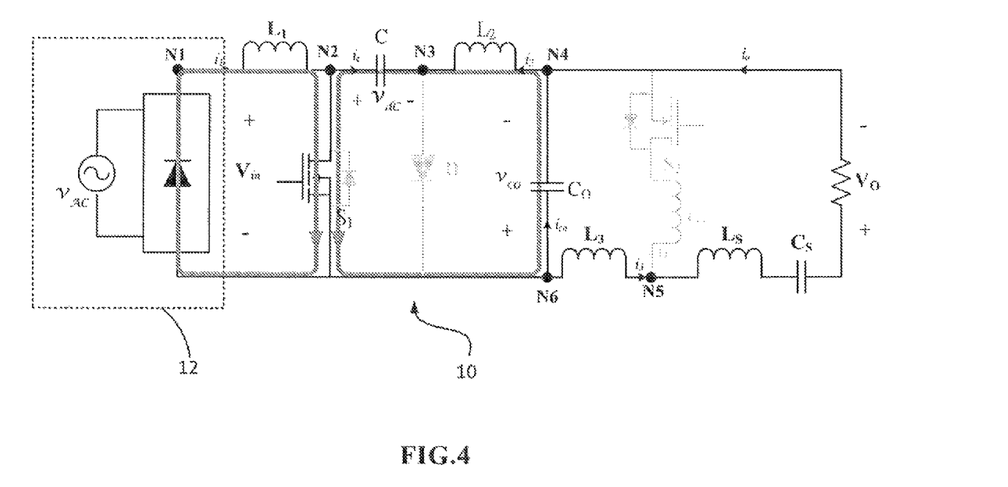
FIG. 4 illustrates an equivalent schematic of the electronic ballast of FIG. 3 in the first status in accordance with one embodiment of the present invention.

FIG. 4 illustrates an equivalent schematic of the electronic ballast of FIG. 3 in the first status in accordance with one embodiment of the present invention. During the first status, the switch $S_1$ is turned on and the switch $S_2$ is turned off. Thus, there is no current flowing through the diode D, the switch $S_2$ and the inductor $L_4$ (shown in gray). The switch $S_1$ is turned on to loop the rectifier circuitry 12, the inductor $L_1$, and the switch $S_1$, so as to charge the inductor $L_1$ and generates a current the DC-link capacitor C discharges the energy to the inductor $L_2$ and generates a current $i_c$. The switch $S_2$ is turned off so as to loop the load, the capacitor Cs, the inductor Ls and $L_3$, and the capacitor $C_o$. As a result, the resonant current $i_o$ flowing through the load is negative.

Figure 5:
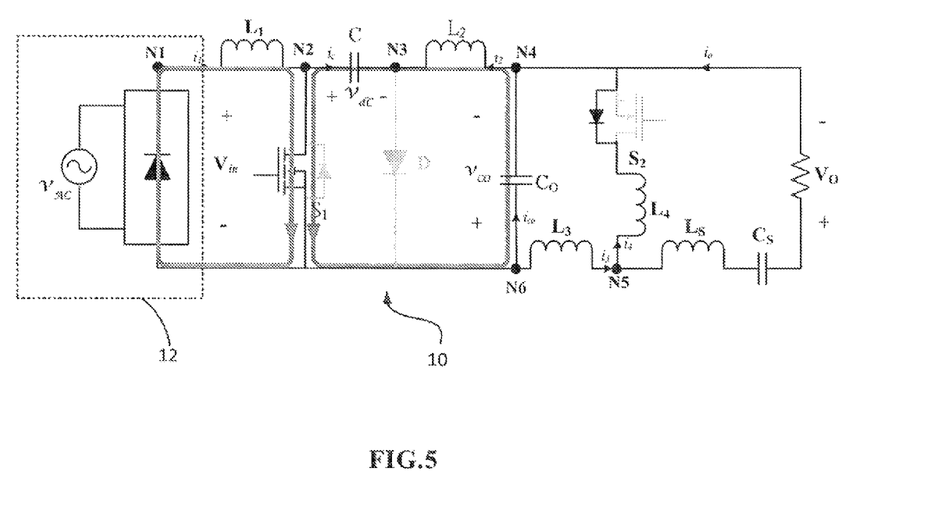
FIG. 5 illustrates an equivalent schematic of the electronic ballast of FIG. 3 in the second status in accordance with one embodiment of the present invention.

FIG. 5 illustrates an equivalent schematic of the electronic ballast of FIG. 3 in the second status in accordance with one embodiment of the present invention. During the second status, the status of the switch $S_1$ is on and the status of the switch $S_2$ is off. At this time, the DC-link capacitor C transfers the energy to the inductor $L_2$ via the switch $S_1$ and outputs the energy to a resonant inverter. The resonant current $i_o$ is still negative at this point. The AC source $V_{AC}$ charges the inductor L via the rectifier circuitry 12 and the switch $S_1$. Then, the switch $S_1$ is turned off and the switch $S_2$ is turned on, the electronic ballast enters into a third status.

Figure 6:
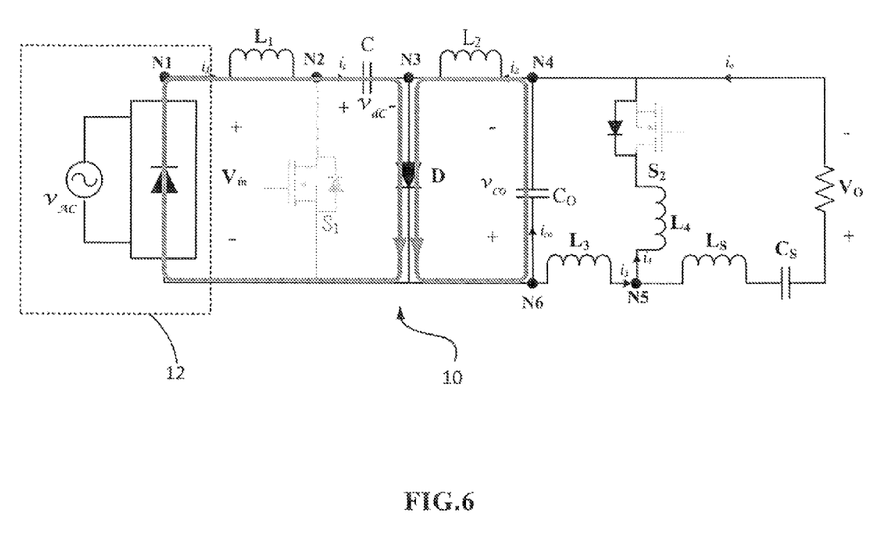
FIG. 6 illustrates an equivalent schematic of the electronic ballast of FIG. 3 in the third status in accordance with another embodiment of the present invention.

FIG. 6 illustrates an equivalent schematic of the electronic ballast of FIG. 3 in the third status in accordance with another embodiment of the present invention. During the third status, there is no current flowing through the switch $S_1$ (shown in gray). The inductor L1, the DC-link capacitor C, the diode D, and the rectifier circuitry 12 form a loop, and the current $i_1$ is equal to $i_c$. The input voltage $V_{in}$ charges the inductor $L_1$ and the DC-link capacitor C, and the resonant current is negative. The electronic ballast enters a fourth status when the resonant current $i_o$ inverts to positive.

Figure 7:
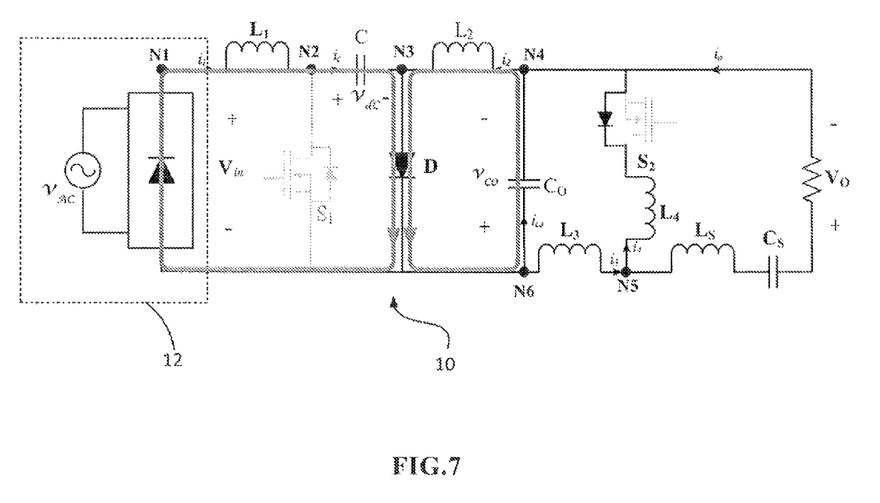
FIG. 7 illustrates an equivalent schematic of the electronic ballast of FIG. 3 in the fourth status in accordance with another embodiment of the present invention.

FIG. 7 illustrates an equivalent schematic of the electronic ballast of FIG. 3 in the fourth status in accordance with another embodiment of the present invention. When entering to the fourth status, the switch $S_1$ is turned off and the switch $S_2$ is still turned on. The input voltage $V_{in}$ charges the inductor $L_1$ and the DC-link capacitor C, at this time. the resonant current $i_o$ is positive and flowing through the switch $S_2$. The resonant inverter completes its inversion. After the charge of the inductor $L_4$, the current $i_4$ inverted to positive and enter to a fifth status.

Figure 8:
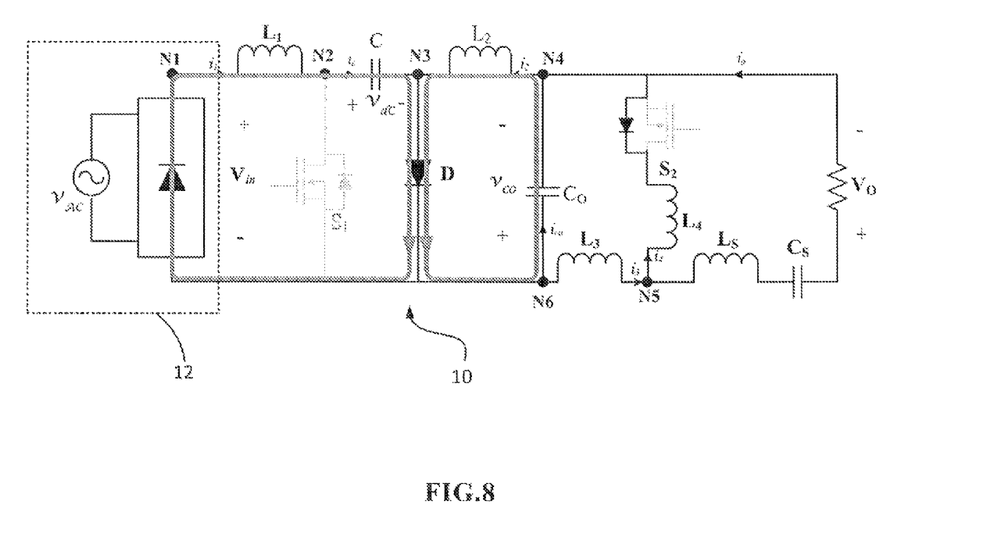
FIG. 8 illustrates an equivalent schematic of the electronic ballast of FIG. 3 in the fifth status in accordance with another embodiment of the present invention.

FIG. 8 illustrates an equivalent schematic of the electronic ballast of FIG. 3 in the fifth status in accordance with another embodiment of the present invention. In the fifth status, the switch $S_1$ is keeping off and the switch $S_2$ is keeping on. The inductor $L_4$ is charged off and starts to discharge. The current $i_4$ is inverted to positive and force the current $i_2$ drop. When the current $i_2$ drops to zero, the electronic ballast enters to a sixth status.

Figure 9:
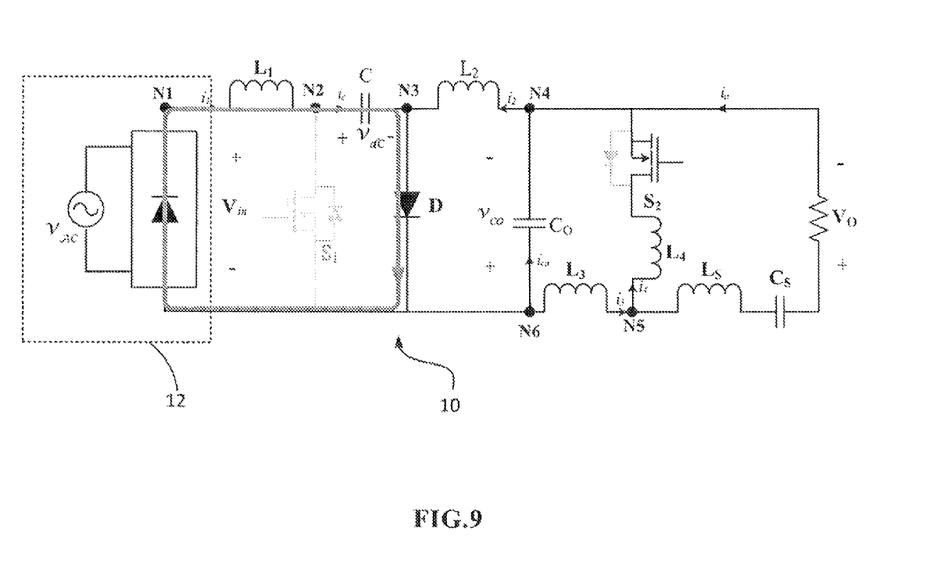
FIG. 9 illustrates an equivalent schematic of the electronic ballast of FIG. 3 in the sixth status in accordance with another embodiment of the present invention.

FIG. 9 illustrates an equivalent schematic of the electronic ballast of FIG. 3 in the sixth status in accordance with another embodiment of the present invention The current $i_2$ is zero when the switch $S_1$ is still of and the switch $S_2$ is still on.

Figure 10:
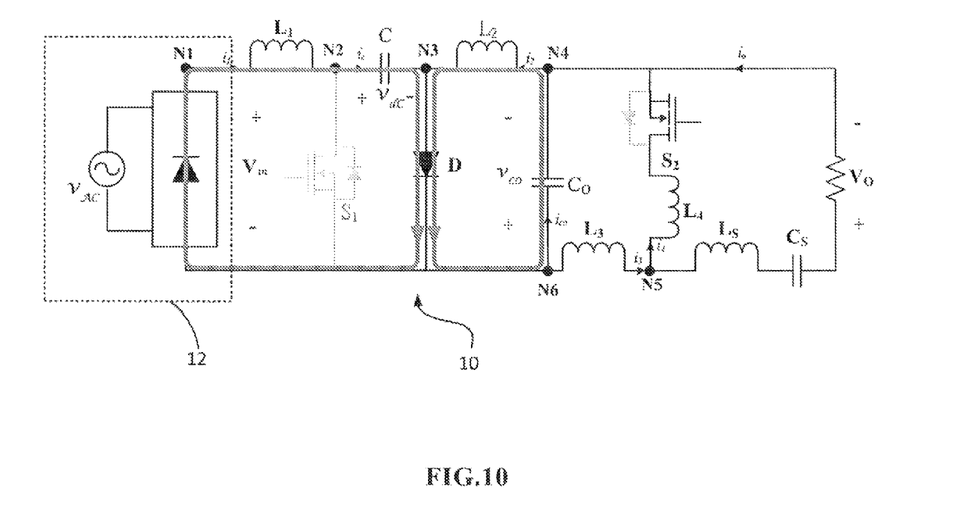
FIG. 10 illustrates an equivalent schematic of the electronic ballast of FIG. 3 in the seventh status in accordance with another embodiment of the present invention.

FIG. 10 illustrates an equivalent schematic of the electronic ballast of FIG. 3 in the seventh status in accordance with another embodiment of the present invention. When the current $i_2$ inverts to positive, the electronic ballast 10 enters to a seventh status which the switch $S_1$ is off and the switch $S_2$ is on.

Figure 11:
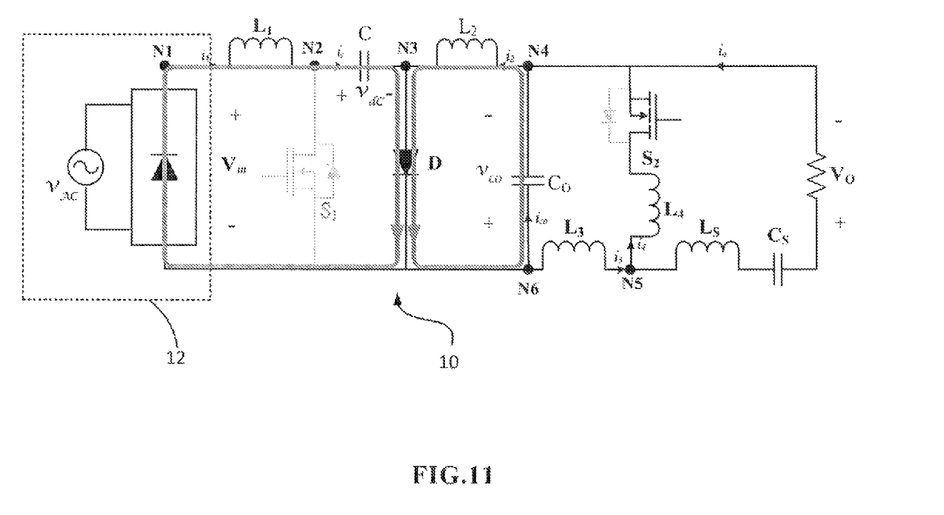
FIG. 11 illustrates an equivalent schematic of the electronic ballast of FIG. 3 in the eighth status in accordance with another embodiment of the present invention.

FIG. 11 illustrates an equivalent schematic of the electronic ballast of FIG. 3 in the eighth status in accordance with another embodiment of the present invention. When the resonant current $i_o$ inverts to negative, the electronic ballast 10 enters to a eighth status. At this stage, the switch $S_1$ is off and the switch $S_2$ is on, and the resonant current $i_o$ is negative and flowing through the switch $S_2$. The resonant inverter completes its inversion. Next, the switch $S_1$ is turned on and the switch $S_2$ is turned off and returned to the first status to complete a cycle.

An equation of a turn-on time $d(\tau)$ of the switch $S_1$ and s turn-on time $d'(\tau)$ of the switch $S_2$ can be given by:

$$d'(\tau)=1-d(\tau) \quad (1)$$

And the equation (1) can be written by:

$$d(\tau) = \frac{1}{1+\frac{V_m}{V_o}|\sin\omega\tau|} \quad (2)$$

Wherein, the Vm|sin ωτ| is the rectified output source $V_{in}$.

In other words, the conducting time of the diode of the input side can be changed by controlling the turn-on time of the switch $S_1$, so as to correct the power factor. The switching of the switch $S_2$ is integrated with the resonant inverter with series resonant parallel loaded (SRPL). And, the switches $S_1$ and $S_2$ are complementary switching at high frequency. The control circuit is very simple.

When the duty cycle of the switch $S_1$ is consist with the equation (2), the electronic ballast 10 has the ability to transfer the power instantaneous. Thus, the DC-link capacitor C doesn't need to store mass energy so that the capacitor with small capacitance can be selected, such as less than 10uF. In one preferred embodiment, the capacitance of the DC-link capacitor is 1 uF. In other words, the electronic ballast 10 doesn't need to select electrolytic capacitors to implement the DC-link capacitor C. As a result, the life time of the circuit can be enhanced.

The single stage electronic ballast of the present invention has the ability of power factor correction, so it can adapt with different supplied voltages of each country.

The single stage electronic ballast of the present invention has less components than the conventional two-stage electronic ballast. It reduces the power consumption and simplifies the control circuit. Moreover, the single stage electronic ballast of the present invention overcomes the issue that conventional single stage electronic ballast has to select the electrolytic capacitors so as to extend the life time of the circuit. The single stage electronic ballast has longer life time than the conventional electronic ballast.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A single stage electronic ballast with power factor correction, comprising:
    a first inductor, coupled between a first node and a second node;
    a first capacitor, coupled between said second node and a third node;
    a second inductor, coupled between said third node and a fourth node, wherein said fourth node couples to a negative end of a load;
    a second capacitor and a third inductor coupled in series between a positive end of said load and a fifth node;
    a fourth inductor coupled between said fifth node and a sixth node;
    a first switch coupled between said second node and said sixth node;
    a diode coupled between said third node and said sixth node;
    a third capacitor coupled between said fourth node and said sixth node; and
    a second switch and a fifth inductor coupled in series between said fourth node and said fifth node;
    wherein, said first node and said sixth node coupled to a positive end and a negative end of an input power source respectively, and wherein said first switch and said second switch are controlled with complementary switching so as to provide an output voltage in response to said input power source and a variation of said load.

2. The electronic ballast as claimed in claim 1, further comprising a diode rectifier circuitry coupled between said first node and said sixth node.

3. The electronic ballast as claimed in claim 1, wherein an equation of a turn-on time of said first switch, said input source, and said output voltage can be given by:

$$d(\tau) = \frac{1}{1+\frac{V_m}{V_o}|\sin\omega\tau|},$$

wherein $d(\tau)$ is said turn-on time of said first switch, Vm|sin ωτ| is said input source, and Vo is said output voltage.

4. The electronic ballast as claimed in claim 1, wherein said first capacitor is not an electrolytic capacitor.

5. The electronic ballast as claimed in claim 1, wherein a capacitance of said first capacitor is less than 10uF.

6. The electronic ballast as claimed in claim 1, wherein said load is an intensity discharge lamp.

7. The electronic ballast as claimed in claim 1, wherein a capacitance of said first capacitor is 1uF.

* * * * *